United States Patent

Hauser

(10) Patent No.: US 9,604,794 B2
(45) Date of Patent: Mar. 28, 2017

(54) APPARATUS FOR HANDLING FINE BULK MATERIAL

(71) Applicant: THE YOUNG INDUSTRIES, INC., Muncy, PA (US)

(72) Inventor: Joseph Anthony Hauser, Williamsport, PA (US)

(73) Assignee: THE YOUNG INDUSTRIES, INC., Muncy, PA (US)

( * ) Notice: Subject to any disclaimer, the term of this patent is extended or adjusted under 35 U.S.C. 154(b) by 0 days.

(21) Appl. No.: 15/247,484

(22) Filed: Aug. 25, 2016

(65) Prior Publication Data
US 2016/0362262 A1   Dec. 15, 2016

Related U.S. Application Data

(63) Continuation-in-part of application No. 14/506,994, filed on Oct. 6, 2014.

(51) Int. Cl.
| | | |
|---|---|---|
| *B65G 33/16* | (2006.01) | |
| *B65G 53/48* | (2006.01) | |
| *B65G 33/14* | (2006.01) | |
| *B65G 53/16* | (2006.01) | |
| B65G 33/20 | (2006.01) | |

(52) U.S. Cl.
CPC .............. *B65G 53/48* (2013.01); *B65G 33/14* (2013.01); *B65G 53/16* (2013.01); *B65G 33/20* (2013.01); *B65G 2201/04* (2013.01)

(58) Field of Classification Search
CPC ........ B65G 33/14; B65G 33/16; B65G 33/18; B65G 19/14; B65G 19/16; B65G 53/48

USPC ................. 406/53, 55, 93, 95, 191
See application file for complete search history.

(56) References Cited

U.S. PATENT DOCUMENTS

| 1,106,736 A | 8/1914 | Schuler |
|---|---|---|
| 1,258,911 A | 3/1918 | Kinyon |

(Continued)

OTHER PUBLICATIONS

The Young Industries, Inc., Quote sent to Potential Customer, Oct. 24, 2014.

(Continued)

*Primary Examiner* — Joseph Dillon, Jr.
(74) *Attorney, Agent, or Firm* — Vorys, Sater, Seymour and Pease LLP

(57) ABSTRACT

Apparatus including a support; first tubular conduit of gas impermeable material having open and closed ends providing an axially disposed passageway with at least one radial outlet; a second tubular conduit of gas permeable material encompassing and spaced from such first tubular conduit, having closed ends, providing a first annular passageway communicating with the radial outlet; a third tubular conduit of gas impermeable material mounted on such support, encompassing and spaced from such second tubular conduit, providing a second annular passageway having open and closed ends and having an inlet at such closed end, a helical member mounted coaxially on such second tubular member, and a device for rotating the first tubular conduit and method using same wherein air under pressure travels from the axially disposed passageway, through the radial outlet into the first annular passageway and through the gas permeable material into the second annular passageway.

2 Claims, 3 Drawing Sheets

(56) References Cited

U.S. PATENT DOCUMENTS

| | | | | |
|---|---|---|---|---|
| 1,350,419 | A | * | 8/1920 | Morrison ............ C21B 13/0026 406/56 |
| 3,004,799 | A | * | 10/1961 | Tikal ...................... B65G 53/58 406/55 |
| 3,099,496 | A | | 7/1963 | Kayser |
| 3,970,547 | A | * | 7/1976 | Theodore .................. B07B 4/06 209/136 |
| 4,138,162 | A | | 2/1979 | Noren |
| 4,928,739 | A | * | 5/1990 | Teubert .................. B65G 53/58 141/5 |
| 4,970,830 | A | | 11/1990 | Schlick |
| 5,289,640 | A | | 3/1994 | McCabe |
| 6,976,575 | B2 | | 12/2005 | Koch et al. |
| 7,137,759 | B1 | | 11/2006 | Ambs |
| 7,303,597 | B2 | | 12/2007 | Sprouse et al. |
| 7,320,561 | B2 | | 1/2008 | Ambs |
| 7,360,639 | B2 | | 4/2008 | Sprouse et al. |
| 8,011,861 | B2 | | 9/2011 | Sprouse et al. |
| 8,087,851 | B1 | | 1/2012 | Jarvis et al. |
| 8,200,367 | B2 | | 6/2012 | Foley et al. |
| 8,353,394 | B2 | | 1/2013 | Chang et al. |
| 8,480,336 | B2 | | 7/2013 | Krebs |
| 8,720,805 | B1 | | 5/2014 | Koenig |
| 9,044,047 | B2 | | 6/2015 | Hunking et al. |
| 2003/0091397 | A1 | * | 5/2003 | Fingerle ................ B65G 33/14 406/53 |
| 2003/0226561 | A1 | | 12/2003 | Darbonne, Sr. |
| 2005/0050624 | A1 | | 3/2005 | Pangramuyen |
| 2009/0304461 | A1 | * | 12/2009 | Strohschein ......... B65G 53/521 406/11 |
| 2012/0266481 | A1 | | 10/2012 | Heffernan et al. |
| 2013/0000384 | A1 | | 1/2013 | Yamaguchi et al. |
| 2014/0008470 | A1 | | 1/2014 | Schaefer |
| 2015/0001045 | A1 | * | 1/2015 | Shimizu ................ B65G 33/14 198/657 |

OTHER PUBLICATIONS

The Young Industries, Inc., Drawings sent to Potential Customer, Nov. 28, 2014.

Rotary Union, Wikipedia, URL: <https://en.wikipedia.org/wiki/Rotary_union>, retrieved from the Internet May 7, 2016.

Duff-Norton rotary union unit, Grainger webpage, URL:<https://www.grainger.com/product/DUFF-NORTON-Rotary-Union-1CVE6>, retrieved from the Internet May 7, 2016.

* cited by examiner

APPARATUS FOR HANDLING FINE BULK MATERIAL

CROSS-REFERENCE TO RELATED APPLICATION

This is a continuation in part of U.S. patent application Ser. No. 14/506,994, filed Oct. 6, 2014, incorporate herein by reference.

FIELD OF THE INVENTION

This invention relates to an apparatus for handling fine bulk material and more particularly to an apparatus for conveying such material by means of an auger shaft at a steady and even flow rate.

BACKGROUND OF THE INVENTION

In the use of an auger in conveying fine bulk materials, it has been found that such usage results in an unsteady and uneven flow of materials, and even stoppage due to clogging. Such effects have been found to be caused by the accumulation and settlement of fine material particles in the spacing between helical flights which diminishes and possibly blocks the flow of material through the conveyance device. The result of such accumulation and settlement of material particles is a loss of capacity due to material accumulation diminishing the space between helical flights, and a reduction in the uniformity of the material being conveyed due to the detachment and discharge of segments of material lodged in helical flights. The deeper the spacing between helical flights, the greater the accumulation and settlement of material sought to be conveyed.

U.S. Pat. No. 8,011,861 to Sprouse and U.S. Pat. No. 1,258,911 to Kinyon show conventional connections for feeding air to into the open end of a hollow shaft to discharge through radial holes of the hollow shaft.

The rotary connection of the air supply in the U.S. Pat. No. 8,011,861 to Sprouse, illustration reference number 156, is very similar in concept to commercially-available rotary unions. That is, it employs an internal bearing 168, an internal seal 176, a hollow shaft 134 & 170 and a stationary housing 162 not noticeably connected to the feeder and which is piped to a remote gas supply 160. The only distinctions are (1) the auger shaft 134 extends into and comprises a part of the rotary connection rather than being externally coupled to it and (2) the bearing within the rotary connection appears to act as a support point for auger shaft 134.

Kinyon (U.S. Pat. No. 1,258,911) describes the connection between the hollow auger shaft—illustration reference 7—and the air supply conduit—reference 12—as a "packed joint" reference 13. Based upon the vintage of the patent, the described function of the "packed joint" and its name, it is apparent its "packed joint" is an arrangement also known to engineers and mechanical tradesmen as a "stuffing box" or "packing gland". This class of rotary seal consists of a generally stationary housing which a shaft passes through. In the Kinyon patent, the stationary housing of packed joint 13 is rigidly attached to stationary air conduit 12, which conduit ends near its attachment point to the packed joint. Rotating hollow shaft 7 is inserted into the stationary housing, through the follower and the packing material to end just short of contact with the end of air conduit 12. The "packed joint" employed by Kinyon is an adaptation of the ubiquitous packing gland.

Accumulation of powdered material between helical flights reduces the cubic feet per revolution capacity of an auger shaft and thus requires operating the feed mechanism at higher rotational speeds to attain the same feed rate when there is no such blockage. Accordingly, it is the principal object of the present invention to provide an apparatus for receiving, conveying and discharging a fine bulk material, utilizing a helical shaft for impelling such material in a continuous and uniform flow pattern.

SUMMARY OF THE INVENTION

The principal object of the present invention is achieved by an apparatus generally including a support; a first tubular conduit formed of a gas impermeable material journalled in such support, having one closed end providing an axially disposed passageway with at least one radial outlet; a second tubular conduit formed of a gas permeable material encompassing and spaced from such first tubular conduit, having closed ends, providing a first annular passageway communicating with the radial outlet of said first tubular conduit's axially disposed passageway; a third tubular conduit formed of a gas impermeable material mounted on such support, encompassing and spaced from such second tubular conduit, providing a second annular passageway closed at one end thereof, opened at a spaced end thereof and provided with an inlet at such one end thereof; a helical member mounted coaxially on such second tubular member, in such second annular passageway, between the closed and spaced outlet thereof; means for injecting a fluid under pressure into the first passageway and the radial passageway between the first and second annular passageways; and means for rotating the first tubular conduit.

Preferably, the third tubular conduit is provided with an inlet duct provided with a passage for funneling material gravity fed from an aligned bin into the second annular passageway, and an outlet duct communicating with the opposite end of the second tubular passageway into which material received through the inlet end thereof is be conveyed and discharged into the outlet duct, guiding such material into a conveyer duct, a receptacle or a bin. Material gravity fed into one end of the second annular passage and conveyed therethrough to the other end thereof by rotation of the first tubular member provided with the helical member, is prevented from accumulating and settling in the spacing between helical flights by air under pressure injected into and through the axial passageway of the first tubular conduit, one or more radial passageways in such first tubular conduit into the first annular passageway and through the interstices of the second annular conduit into the spaces between helical flights, precluding material from settling and accumulating therein. Such air further would function to fluidizing the conveyed material, facilitating its flow.

DETAILED DESCRIPTION OF THE PREFERRED EMBODIMENT OF THE INVENTION

Figure 1:
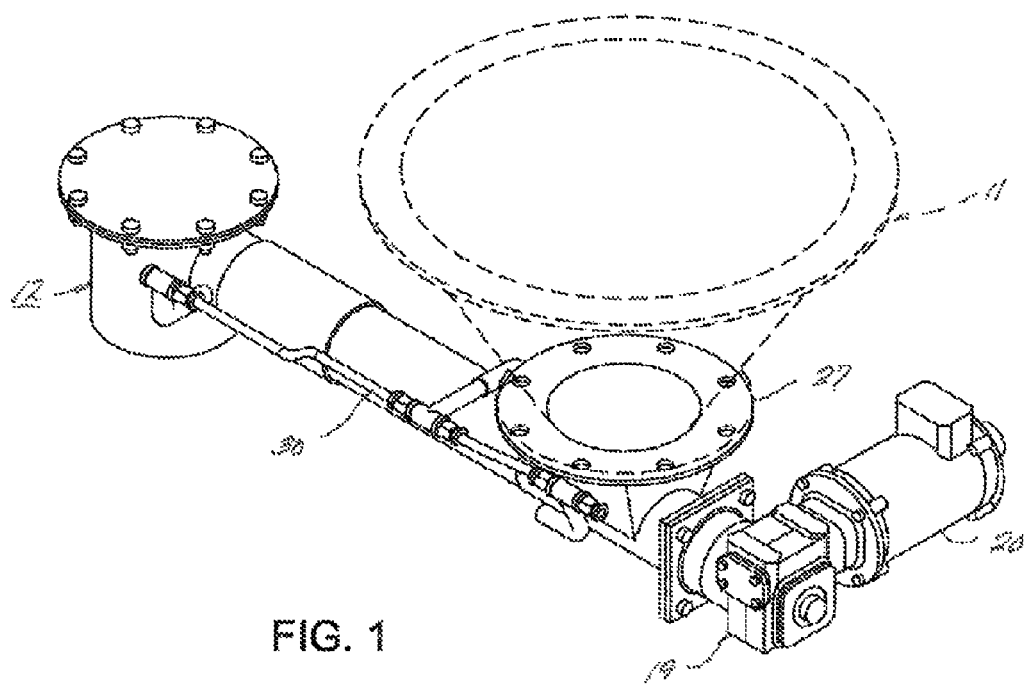
FIG. 1 is a perspective view of an apparatus embodying the present invention.

Referring to the drawings, there is illustrated an embodiment of the invention, generally including an assembly 10 for conveying a fine bulk material gravity fed from a vessel 11 and discharged into a conduit 12. Assembly 10 includes an inner, tubular conduit 13 formed of an impermeable material, an intermediate tubular conduit 14 formed of a permeable material encompassing, spaced from and disposed coaxially relative to inner conduit 13 and an outer tubular conduit 15 also formed of an impermeable material encompassing, spaced from and also disposed axially relative to inner conduit 13.

Figure 5:
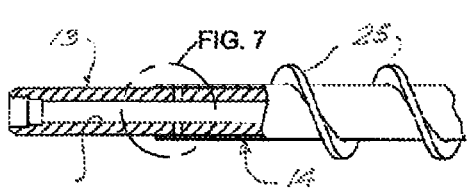
FIG. 5 is a partial view of an end of the auger shaft shown in FIG. 4, illustrating a portion thereof in vertical cross-section.
Figure 6:
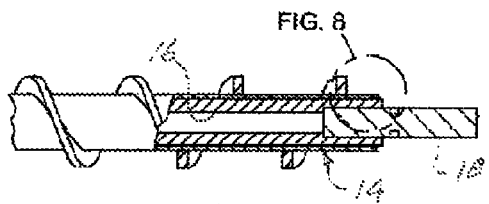
FIG. 6 is a partial view of an opposite end of the auger shown in FIG. 4, illustrating a portion thereof in vertical cross-section.

Inner tubular conduit 13 includes an axially disposed fluid passageway 16, having one end as shown in FIG. 5 extending through an opening in a side of conduit 12 and journalled in a mounting provided on an opposite side of conduit 12, and an opposite end as shown in FIG. 6, provided with a stub shaft portion 18 having one end thereof extending into and closing an end of passageway 16 and an opposite end extending into and journalled in the housing of a gear reduction unit 19, connected to the gear train of such unit, driven by a motor 20 mounted in the housing of the gear unit which could also be driven by a belt or roller chain drive.

Figure 9:
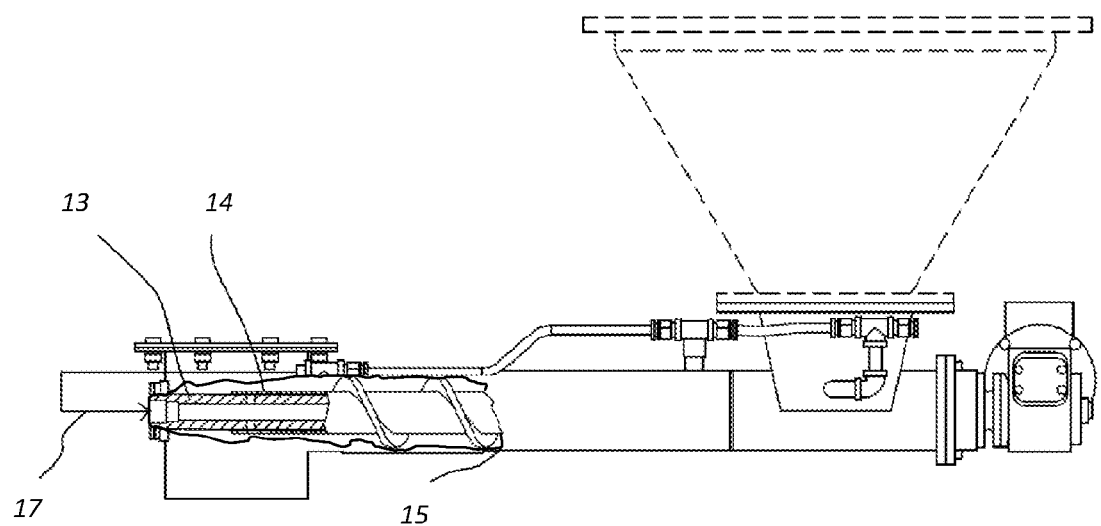
FIG. 9 is a partial open side elevational view of apparatus shown in FIG. 1 with a portion removed to show a portion of the auger shaft indicated in FIG. 5.

FIG. 9 is a partially open side elevational view of assembly 10 shown in FIG. 1 with a portion removed to show the portion of the auger shaft indicated in FIG. 5 to show the arrangement of the inner tubular conduit 13 and intermediate tubular conduit 14 within outer tubular conduit 15.

Figure 7:
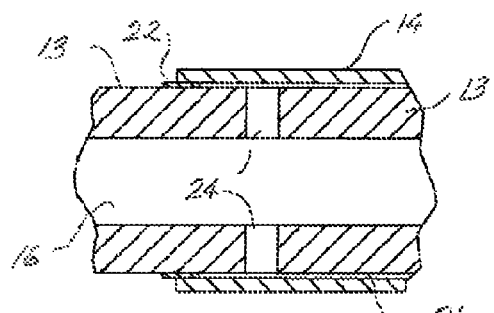
FIGS. 7 is a partial view of the portion of the auger shaft indicated in FIG. 5.
Figure 8:
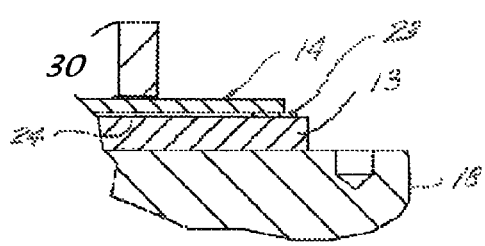
FIG. 8 is a partial view of the portion of the auger shaft indicated in FIG. 6.

As best shown in FIGS. 5 through 8, intermediate tubular conduit 14 cooperates with inner tubular conduit 13 to provide an annular passageway 21 closed at opposite ends by annular sealing components 22 and 23, as best shown in FIGS. 7 and 8. Intercommunicating passageways 16 and 21 is one or more radially disposed passageways 24 as best shown in FIG. 7. Conduit 14 may be formed of a material sold by The Young Industries, Inc. of Muncy, Pa. under the trademark TRANSFLOW. Disposed on and secured to conduit 14 is a helical member 25 cooperating with inner and intermediate conduits 13 and 14 to provide an auger shaft functional to convey bulk particulate material within the flights thereof.

Figure 2:
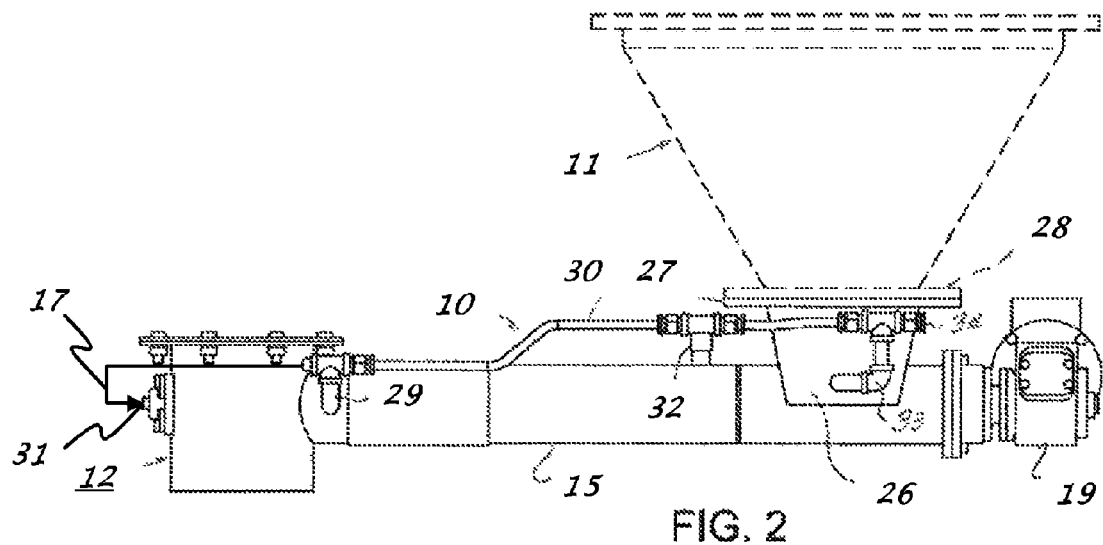
FIG. 2 is a side elevational view of the apparatus showing in FIG. 1.
Figure 3:
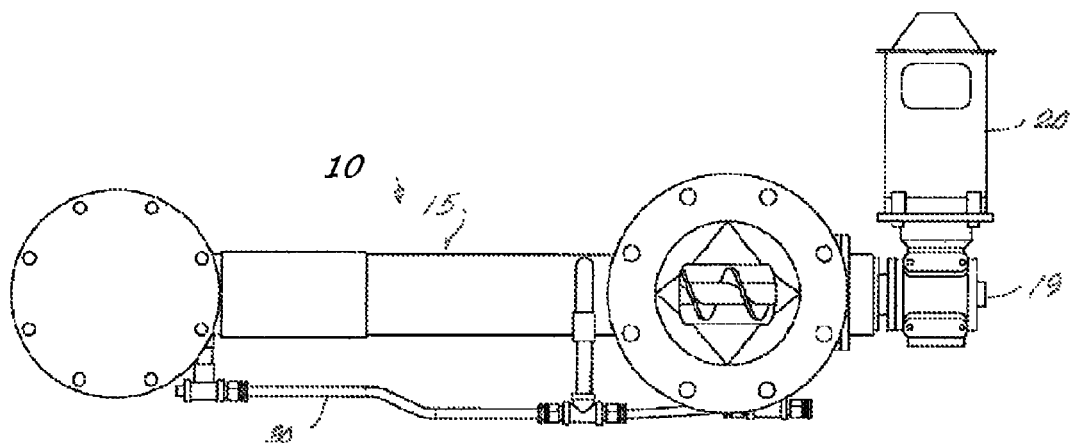
FIG. 3 is a top plan view of the apparatus shown in FIG. 1.
Figure 4:
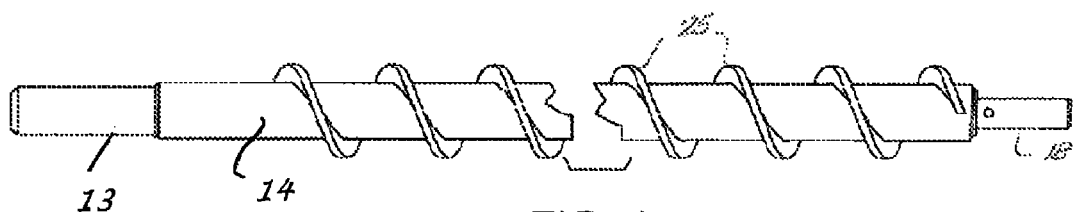
FIG. 4 is an enlarged, side view of the auger shaft provided in the apparatus shown in FIGS. 1, 2 and 3, having an intermediate portion thereof broken away.

Outer tubular conduit 15 cooperates with intermediate tubular conduit 14 to provide an annular passageway including helical member 25, preferably spaced from conduit 15. As best shown in FIGS. 1 through 3, one end of conduit 15 is secured to a side of conduit 12 with the passageway between conduit 13 and 14 communicating with the interior of conduit 12 and an end of helical member 25 extending into the interior of conduit 12, and the other end thereof is closed with a flange secured to and supported on a matching flange of the housing of unit 19.

Mounted on one end of conduit 15, adjacent unit 19 and spaced from conduit 12 is a duct 26 which communicates with the passageway between the intermediate and outer conduits 14 and 15 through an aligned opening in conduit 15, as shown in FIG. 3, for gravity feeding a bulk particulate material into the annular passageway between the intermediate and outer conduits 14 and 15, to be conveyed by helical member 25 to and discharged into conduit 12. The upper end of funnel component 26 is provided with an annular flange 27 to which a compatible flange 28 of an elevated bin provided with a frusto-conically configuration section may be attached for gravity feeding material to be conveyed into outer conduit 15.

Supported on assembly 10 is a pressurized air line 30 connected at one end to outer conduit 15 as at 29 and communicating with axial passageway 16 in conduit 13 via conduit 17 as at 31 for air to enter the open end of the axial passageway 16, connected at a first intermediate location to outer conduit 15 and communicating with the annular passageway between conduits 14 and 15 as at 32, communicating with the lower end of duct 26 as at 33 and connectable to a source of air under pressure by means of a connection end 34.

In the operation of the assembly as described to convey bulk particulate material gravity fed from vessel 11 into conduit 12, motor 20 is operated to rotate inner conduit 13 and intermediate conduit 14 with helical member 25, and air under pressure is supplied to air line 30. As the helical member is rotated, material fed through duct 26 into outer conduit 15 will be caused to be conveyed by helical member 25 and discharged into conduit 12. As air under pressure is applied to air line 30, such air will flow through, axial passageway 16, radial passageways 24, annular passageway 21, through the interstices of intermediate conduit 14 and into the annular passageway between conduits 14 and 15, providing a fluidizing layer of air between flights of helical member 25. Such fluidizing layer of air between flights of helical member 25 functions to prevent the settlement and accumulation of material being conveyed thus providing a continuous and even flow of material being conveyed.

The continuous and even flow of material further is enhanced by injecting air under pressure through connector conduit 33 into duct 26, fluidizing the material gravity fed into conduit 15, thus enhancing an even flow, and by injecting air under pressure through connector conduit 32 into the outer side of conduit 15, further fluidizing the material being conveyed by the helical member.

Any form of material holding and/or conveying device including vessels, bins, conduits and the like may be used to feed material into assembly 10, and any such device may be used to receive material conveyed by such assembly.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. An auger shaft comprising:
    a first tubular conduit formed of a gas impermeable material, having a closed end and an opposed open end, providing an axially disposed passageway extending from the open end to the closed end with at least one radial outlet passageway, a second intermediate tubular conduit formed of a gas permeable material, encompassing and spaced from the first tubular conduit, the second conduit having closed opposite ends, the second conduit providing with the first inner tubular conduit a first annular passageway communicating with the radial outlet in the first tubular conduit, wherein a pair of annular sealing components close the first annular passageway at the opposite ends and space the second intermediate tubular conduit from the first tubular conduit, wherein one said annular sealing component is respectively at each of the opposite ends of the first annular passageway;

a helical member mounted on the second tubular conduit, the first tubular conduit's first open end in communication with the axially disposed passageway of the first tubular conduit, the axially disposed passageway through the radial outlet in communication with the first annular passageway, and the first annular passageway through interstices of the permeable tubular conduit in communication with spaces between flights of the helical member.

2. The auger shaft of claim 1, wherein the first tubular conduit's first open end is for receiving air under pressure for passing into and through the axially disposed passageway of the first tubular conduit, through the radial outlet, into the first annular passageway and through interstices of the permeable tubular conduit into spaces between flights of the helical member.

* * * * *